United States Patent Office 3,661,779
Patented May 9, 1972

---

3,661,779
GREASES CONTAINING PARTICULATE POLYMERIC DIIMIDE THICKENERS
Garth M. Stanton, Pinole, Calif., assignor to Chevron Research Company, San Francisco, Calif.
No Drawing. Filed Aug. 1, 1969, Ser. No. 846,941
Int. Cl. C10m 5/20
U.S. Cl. 252—49.6        13 Claims

---

ABSTRACT OF THE DISCLOSURE

Grease compositions are disclosed comprising a lubricating fluid and a thickener consisting essentially of a polymeric diimide having a number average molecular weight of 10,000 to 50,000, with the thickener comprising 5 to 40 weight percent of the grease composition and being dispersed in the grease as particles less than five microns in diameter. Derivatives of pyromellitic dianhydride are particularly preferred.

BACKGROUND OF THE INVENTION

This invention relates to thermally stable grease compositions, and more particularly, to grease compositions thickened with polymeric diimides.

There is a demand in the lubricant industry for lubricating compositions effective over an increasingly wide operational range of pressures and temperatures. For example, high-speed aircraft with larger power plants and changed structural design are continually designed and placed in operation. These engineering developments present stringent bearing lubrication conditions. In such applications, anticipated loads may range as high as 100,000–150,000 p.s.i. with ambient temperatures from −65° F. to 600° F. or higher.

It is particularly difficult to provide additives for lubricating compositions, such as thickeners which convert fluid oleaginous bases to greases, extreme pressure agents which impart lubricity to oleaginous bases, oxidation-stabilizing and degradation-inhibiting compounds and the like, that are effective at the upper end of this temperature range. Many known thickeners, such as the soaps of fatty acids, will not produce a grease which is satisfactory above about 350° F. In order to produce greases stable at higher temperatures, grease formulators have had to rely on thickeners such as arylureas, siloxanes, and clays. Several high-temperature thickeners are listed by B. W. Hotten in Advances in Petroleum Chemistry and Refining, 9, 99–153 (Interscience Publ., 1964). Among the compounds used as high-temperature grease thickeners have been monomeric pyromellitimides. Several of these diimide compounds are listed by Hotten and are also disclosed by Smith et al., U.S. Pat. 3,078,228. Monomeric compounds such as these constitute one major class of grease thickeners.

A second and distinct class of thickeners are the polymers. As a class, polymers have been considered for use as grease thickeners much less frequently than the monomeric compounds. Further, far fewer polymers than monomers have been found to be satisfactory as thickeners. Hotten cites a number of the problems associated with use of polymers as grease thickeners.

Notwithstanding the general difficulties presented by use of polymers as thickeners, a few particular polymers have been found to be effective as thickeners for thermally stable greases. Hotten cites certain siloxane combinations in this regard. In general, however, polymers as a class have not lived up to their initial promise as potential grease thickeners. Too often they have proved to be insufficiently soluble in the lubricating fluid to produce a satisfactory grease. Operable polymeric thickeners have been determined only empirically.

SUMMARY OF THE INVENTION

This invention is a grease composition containing a lubricating fluid and, as a thickener, a polymer having recurring diimide groups in the backbone of the polymer chain and a number average molecular weight of 10,000 to 50,000; and in which the thickener is dispersed as particles less than 5 microns in diameter. The lubricating fluid comprises the major portion of the grease, and the thickener is present as 5–40 weight percent of the total grease. Chief among the diimide polymers are those derived from pyromellitic dianhydride or one of its analogues and various diamines.

DETAILED DESCRIPTION OF THE INVENTION

In its broadest form, the grease of this invention comprises a lubricating fluid as its major component and a thickener which is a polymer having recurring diimide groups in the backbone of the polymer chain and a number average molecular weight of 10,000 to 50,000. This thickener comprises 5–40 weight percent of the total grease, and is dispersed in the grease as particles less than 5 microns in diameter.

The basic structure of the thickener is the polymeric condensation reaction product of a dianhydride and a diamine having a number average molecular weight of 10,000 to 50,000 and the repeating structural unit:

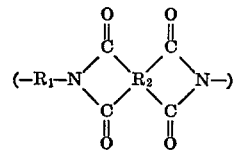

where $R_1$ is a divalent organic radical of from 2–30 carbon atoms, either hydrocarbon or perfluorocarbon, having 0–3 nitrogen or chalcogen hetero atoms each bonded solely to carbon atoms, and no aliphatic unsaturation; and $R_2$ is a tetravalent organic radical of from 2–30 carbon atoms, 0–6 nitrogen or chalcogen hetero atoms each bonded solely to carbon atoms, and no aliphatic unsaturation. It is preferred that $R_1$ and $R_2$ each have 5–20 carbon atoms, and still more preferred that they each have 6–12 carbon atoms. It is also preferred that $R_1$ and $R_2$ each have 0–1 nitrogen or chalcogen hetero atoms.

The principal class of polymers useful as the grease thickeners of this invention are those derived from pyromellitic dianhydride. These have the recurring structure:

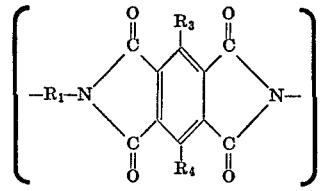

where $R_1$ is as previously defined, and $R_3$ and $R_4$ are each: hydrogen; aryl, saturated alkyl, or alkaryl radicals of 1–13 carbon atoms, preferably 1–6 carbon atoms; or aryl, saturated alkyl, or alkaryl radicals containing 1–13 carbon atoms, preferably 1–6 carbon atoms, and 1–3 nitrogen or chalcogen hetero atoms, preferably 0–1 such hetero atoms, where each such hetero atom is bonded solely to carbon atoms. $R_3$ and $R_4$ are either or both each typically hydrogen, methyl, ethyl, n-propyl, i-propyl, phenyl, naphthyl, diphenyl, pyrrolyl, or thiophenyl. It is preferred that $R_3$ and $R_4$ each have 1–8 carbon atoms, and still more preferred that each have 1–4 carbon atoms and no hetero atoms. It is most preferred that $R_3$ and $R_4$ each be hydrogen, so that the polymeric structure is based on pyromellitic dianhydride itself. Other dianhydrides which may be used include, but are not limited to:

2,3,6,7-naphthalenetetracarboxylic dianhydride
3,3',4,4'-diphenyltetracarboxylic dianhydride
1,2,5,6-naphthalenetetracarboxylic dianhydride
2,2',3,3'-diphenyltetracarboxylic dianhydride
2,2-bis(3,4-dicarboxy-phenyl)propane dianhydride
3,4-dicarboxyphenyl sulfone dianhydride
perylene-3,4,9,10-tetracarboxylic dianhydride
bis(3,4-dicarboxyphenyl)ether dianhydride, and
ethylenetetracarboxylic dianhydride.

$R_1$ is the root of a diamine which is combined with the dianhydride to form the desired polymeric diimide. A wide variety of diamines are satisfactory for use in this polymeric structure. These include, but are not limited to, ethylenediamine,
m-phenylenediamine,
p-phenylenediamine,
4,4'-diaminodiphenylmethane,
4,4'-diaminodiphenylethane,
2,4'-biphenylenediamine,
benzidine,
4,4'-diaminodiphenyl sulfide,
4,4'-diaminodiphenyl sulfone,
4',4-diaminodiphenyl ether,
1,5-diaminonaphthalene,
3,3'-dimethylbenzidine,
2,4-di-(2-amino-t-butyl)toluene,
m-xylylenediamine,
p-xylylenediamine,
hexamethylenediamine,
octamethylenediamine,
nonamethylenediamine,
decamethylenediamine,
3-methylheptamethylenediamine,
4,4-di-methylheptamethylenediamine,
2,11-diaminododecane,
1,2-di-(3-aminopropoxyethane),
2,2-dimethylpropylenediamine,
4-methoxyhexamethylenediamine,
2,5-dimethylhexamethylenediamine,
2,5-dimethylheptamethylenediamine,
3-methylheptamethylenediamine,
5-methylnonamethylenediamine,
1,4-diaminocyclohexane,
1,12-diaminooctadecane,
4,4'-diaminooctafluoro biphenyl,
1,5-diaminopentane,
1,6-diaminohexane,
1,7-diaminoheptane,
1,8-diaminooctane,
1,9-diaminononane,
1,10-diaminodecane,
1,12-diaminododecane,
1,20-diaminoeicosane, and
2,2-diaminohexafluoropropane.

The polymer is prepared by reacting the diamine and the dianhydride to yield, in most cases, an intermediate polyamic acid. From this precursor the polymeric diimide is then formed by condensation. The diamine/dianhydride reaction step is generally conducted at ambient temperature although temperatures of 50–125° F. may be used. The reaction at ambient temperature is generally rapid enough and goes substantially to completion so that no significant benefit is obtained by heating. The ratio of reactants is essentially equimolar. A slight excess of the diamine can be tolerated, but a substantial excess will cause premature termination of polymer chain growth, and the necessary minimum molecular weight average of 10,000 will not be reached. Number average molecular weight may be determined by several conventional means, which are described by Sorenson and Campbell on pages 43–46 of Preparation Methods of Polymer Chemistry (2nd ed., Interscience Publ., 1968). Reaction time will range from a few minutes to an hour or more, depending on the reactants used and the temperature of reaction.

The diamine/dianhydride reaction is conducted in an aprotic solvent. The solvent typically constitutes 50–95 volume percent of the solution. A nonexclusive list of suitable aprotic solvents includes: N,N-dimethylformamide, N,N-dimethylacetamide, N,N-dimethylmethoxyacetamide, dimethyl sulfoxide, tetramethyl urea, N-methylformamide, pyridine, hexamethylphosphoramide, tetramethylene sulfone, and N-acetyl-2-pyrrolidone.

The polymeric diimide is formed by dehydrating the polyamic acid formed from the diamine and dianhydride. This is done by heating the polyamic acid either alone or with a solvent (generally the same aprotic solvent used in the previous reaction) at a temperature of 50°–300° C., preferably at about 100°–200° C. At temperatures above 300° C. the polymer tends to become degraded as it forms. Pressure in this step, as in the prior step, is maintained such that all components (except the product polymer) remain in the liquid phase. In most cases the volatility of all components is such that atmospheric pressure is satisfactory.

If desired, the two reaction steps may be carried out consecutively in the same reaction vessel. The diamine and dianhydride are mixed at ambient temperature and react as the solution is initially being heated. As the temperature continues to increase up into the 100°–500° C., the dehydration reaction occurs.

The product polymeric diimide is obtained as a solid precipitate in the solution after condensation. Total time to complete reaction is from a few minutes to several hours, again depending on the reactant and the temperature used. The solid material is recovered by filtration, solvent removal by heating, or other conventional separation means.

The above description of a method of producing the desired diimide is meant only to be illustrative. Other methods may also be used. Typical examples of formation of a pyromellitimide polymer are found in articles by Bell et al., J. Polymer Science: Part A–1, 5, 3043–3060 (1967); Sroog et al., J. Polymer Science: Part A, 3, 1373–1390 (1965); and Jones et al., Chem. and Industry, 1686–1688 (Sept. 22, 1962).

A principal feature of this invention is the size limitation on the polymer particles. It has been found that the dispersibility of the polymer in the lubricating fluid, and thus its ability to act as a grease thickener, becomes too low to be acceptable when the polymer particles exceed five microns in diameter. The preferred size range is less than two microns, and more preferably less than 0.5 micron. The minimum particle diameter depends on polymer chain length, average molecular weight, method of preparation, and configuration of the constituents in the polymer chain.

It is preferred to form the small particles simultaneously with the condensation of the polymer. This is accomplished by conducting the condensation reaction in a vessel equipped with means to keep the precursor solution in vigorous agitation while the reaction proceeds. Typical such vessels are those equipped with high-speed stirring mechanisms, such as the commercially available "Waring Blendor," or those in which the sole solution is pumped through intersecting passageways, such as the commercialy available 'Stratco Contactor."

No absolute rate of agitation can be stated here, for each different type of reaction vessel will have its own minimum agitation rate necessary to obtain the required particle size. However, the following data will enable those skilled in the art of mechanical agitation to determine the proper agitation rate for any given mixing vessel. In a laboratory scale experiment, approximately 350 ml. of a solution of pyromellitic dianhydride and 4,4'-diaminodiphenyl ether in N,N-dimethylacetamide were reacted while being mixed at room temperature in a onequart volume "Waring Blendor," which had agitator blades turning at approximately 12,000 r.p.m. In a commercial scale experiment, approximately 8 liters of a similar solution was reacted while being mixed in a "Stratco Contactor." This vessel had a volume of 12.5 gals. and an impeller speed of 1800 r.p.m. In both experiments, after 30-60 minutes, the solution was heated to reflux while maintaining agitation. The average diameter of the product diimide polymeric particles was less than five microns.

The particulate polymeric diimides of this invention can be used advantageously to produce greases by thickening lubricating fluids. Compositions wherein the presently provided products are used for this purpose will contain an amount of the product sufficient to provide the required degree of thickening. The thickening powers of the individual products differ, and the effectiveness of a given product varies with a change in the nature of the oleaginous base. Generally, thickened lubricating compositions (i.e., greases) provided by this invention will comprise from about 5 percent to about 40 percent by weight of one or more of the products of this invention. Concentrates which may be dispersed in lubricating fluids to form greases are sometimes made, and these may contain concentrations up to about 50 percent by weight. Usually the thickener will comprise from about 10 percent to about 30 percent of the weight of finished grease.

The lubricating fluids used in the grease compositions of this invention may be from a wide variety of natural or synthetic lubricating fluids. Because of the highly polar nature of the polymeric diimides, it is preferred to use the polar lubricating fluids, since they are more compatible with the thickeners.

Most preferred as lubricating fluids are the perfluorinated oils. These oils have the desirable ability to withstand oxidation at high temperatures. Preferred among the perfluorinated oils are the perfluoropolyethers. These polymers are comprised of monomer units of two to eight carbon atoms, with the preferred materials being prepared from two to three carbon atom monomers. In order that the materials be of proper consistency for fluid bases for the greases, it is preferred that there be no more than about 35 monomer units. Viscosity is in the range of 18 to 470 cs. at 100° F. Reference to the polymers and their preparation may be found in U.S. Pats. 3,214,478, 3,242,218, 3,257,466, and 3,274,239. Although the preferred polymers consist entirely of perfluorocarbonether monomer units, materials which are capped by other groups are suitable. These fluids are colorless and odorless, have high densities and low indices of refraction. The fluids are basically polymers of hexafluoropropylene oxide. Particularly preferred are those perfluoropolyethers commercially available from the DuPont Co. under the trademark "Krytox 143."

Polyorganosiloxanes, also known as silicones or silicone polymers, comprise another class of synthetic lubricating fluids of commercial importance which may be thickened by the polymeric diimides of this invention. Relatively common oils of this type are dimethylsilicone polymer, phenylmethylsilicone polymer, chlorophenylmethylsilicone polymer, and so forth. A suitable siliceous fluid is commercially available under the trademark "Dow-Corning 550." Additional suitable silicon derivatives comprise silanes, silphenylenes, organosilicates and disiloxanes of lubricating oil viscosity.

A third class of synthetic lubricating fluids of interest in the present invention comprises organic polyesters. These may comprise esters of polycarboxylic acids, such as dicarboxylic acid diesters, or may be produced by reacting a polyhydric alcohol with a monocarboxylic acid. Thus, for example, a polyhydric alcohol such as ethylene glycol or pentaerythritol is esterified with an acid of relatively long chain length such as acid, to produce a polyester of lubricating oil viscosity. An operable ester fluid comprises the isostearic acid ester of hexadecanol and is commercially available under the trademark "Emery 3821-R."

Suitable lubricating fluids may also comprise polyethers of the nature of high molecular weight polyoxyalkylene compounds, derived for example from ethylene oxide, propylene oxide and the like substances. Similarly, there may be employed lubricating fluids of related structure, such as propylene oxide-tetrahydrofuran copolymers, and polyaryl ethers. Besides the silicones discussed above, other operable synthetic oleaginous bases include tetra-substituted ureas, esters such as dimethylcyclohexyl phthalate, and similar fluids adapted for lubricant applications.

Finally, natural lubricating fluids such as hydrocarbonaceous mineral, vegetable, and animal oils may also be used. These tend to be less satisfactory than other fluids, however, particularly when the hydrocarbonaceous fluid is non-polar. Usually the less polar fluids require a greater amount of polymeric diimide thickener to produce a satisfactory grease than do the more polar fluids.

The particulate polymeric diimide is milled into the lubricating fluid to produce the finished grease. Many milling procedures are described in the literature, and the particular one chosen in any given situation will depend on the fluid and diimide being used and the equipment available. In some cases, elevated temperatures of 100-250° F. will aid in the milling procedure. The final grease contains 5-40 weight percent polymeric diimide, preferably 10-30 weight percent, and more preferably 10-25 weight percent.

A number of additives may also be present in small amounts in the final grease composition, as long as they are compatible with the lubricating fluid and the thickener. These may include such additives as oxidation inhibitors and rust inhibitors, as well as others which are described in the literature.

The following examples will illustrate this invention:

EXAMPLE 1

A solution containing 75.0 g. of 4,4'-diaminodiphenyl ether in 300.0 g. of N,N-dimethylformamide was prepared. To this was added a solution containing 81.7 g. of pyromellitic dianhydride in 1110.2 g. of N,N-dimethylacetamide. This mixture thus contained nine parts of solvent to one part of reactants. A 697.2 g. portion of the mixture was further diluted to a 30:1 solution by dissolution in 2091.6 g. of N,N-dimethylacetamide.

The 30:1 solution was charged to the "Waring Blendor" described above and stirred for 65 minutes at 157°-166° C. The solution was then cooled overnight and filtered. After drying, 51.9 g. of dry precipitated granular polymer, with an average particle diameter of about 1 to 1½ microns, were obtained.

Thereafter, 17.4 g. of this granular polymer were milled into 85 g. of the commercially available fluorocarbon fluid "Krytox 143 AC." A three-roll mill was used, and the grease was milled three times loosely and eight times tightly. The product grease thus contained 17 weight percent polymeric thickener and 83 weight percent fluorocarbon fluid. The grease had a penetration in two ASTM-D-1403 tests of 257 and 260, respectively. This grease was then subjected to a high-speed bearing test, and in duplicate runs was found to have bearing lives of 950 and 1046 hours, respectively. The bearing test used was a modification of Federal Test Method Standard No. 791a, Method 331.1: heat-treated bearings were used and the test run at 500° F.

EXAMPLE 2

A solution containing 20.0 g. of 1,12-diaminododecane in 378.0 g. of N,N-dimethylacetamide was heated to 75° C. and 21.8 g. of pyromellitic dianhydride was added. The solution was heated to 167° C. while being stirred in the aforesaid "Waring Blendor" for three hours. The product solution was then dried at 250° F. in an oven for one week, yielding 29 g. of dry polymeric particulate product.

Five grams of the dry polymeric material was milled into 20 g. of "Krytox 143 AC" fluorocarbon fluid with the three-roll mill. The product grease had a penetration of 340 and high-speed bearing lives of 395 and over 742 hours. The tests performed are as described in Example 1.

EXAMPLE 3

To a solution containing 10.8 g. of p-phenylenediamine in 300.0 g. of N,N-dimethylacetamide were added 21.8 g. of pyromellitic dianhydride. This solution was heated at 163° C. while being stirred in the aforesaid "Waring Blendor" for ten minutes. Thereafter 235 g. of additional N,N-dimethylacetamide was added and the enlarged solution heated at 163° C. for an additional twenty minutes. The solution was then filtered and dried at 335° F. in an oven for 94 hours to yield the polymeric particulate product.

A grease was prepared by milling 4.4 g. of this polymeric product into 21.3 g. of "Krytox 143 AC" fluorocarbon fluid. This grease had a penetration of 296 and high-speed bearing life of 1047 and 506 hours, in repeated tests of the type described in Example 1.

What is claimed is:

1. A grease composition comprising a lubricating fluid and a thickener consisting essentially of a polymeric diimide made by reacting organic diamines with aromatic tetracarboxylic acid dianhydrides having a number average molecular weight in the range of 10,000 to 50,000, said thickener being dispersed throughout said grease as particles less than 5 microns in diameter and present as 5-40 weight percent of said grease.

2. The composition described in claim 1, wherein said particles are less than 2 microns in diameter.

3. The composition described in claim 1, wherein said polymeric diimide is the reaction product of a diamine and pyromellitic anhydride and has the recurring monomeric unit

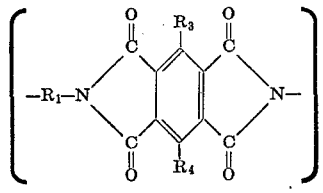

where $R_1$ is a divalent organic radical having 2-30 carbon atoms; 0-3 nitrogen or chalcogen hetero atoms each bonded solely to carbon atoms, and no aliphatic unsaturation; and $R_3$ and $R_4$ are each hydrogen atoms; aryl, saturated alkyl, or alkaryl radicals containing 1-13 carbon atoms and 1-3 nitrogen or chalcogen hetero atoms each bonded solely to carbon atoms.

4. The composition described in claim 3, wherein $R_3$ and $R_4$ are both hydrogen atoms.

5. The composition described in claim 3, wherein said diamine is a diaminoether.

6. The composition described in claim 5, wherein said diaminoether is 4,4'-diaminodiphenyl ether.

7. The composition described in claim 3, wherein said diamine is an alkylene diamine.

8. The composition described in claim 7, wherein said alkylene diamine is 1,12-diaminododecane.

9. The composition described in claim 3, wherein said diamine is an arylene diamine.

10. The composition described in claim 9, wherein said arylene diamine is p-phenylenediamine.

11. The composition described in claim 3, wherein said thickener is present in said grease as 10-30 weight percent of said grease.

12. The composition described in claim 3, wherein said lubricating fluid is polar and nonhydrocarbonaceous.

13. The composition described in claim 12, wherein said lubricating fluid is selected from the group consisting of perfluorinated hydrocarbon oils and silicone fluids.

References Cited

UNITED STATES PATENTS

| | | | |
|---|---|---|---|
| 3,025,241 | 3/1962 | Dreher et al. | 252—51.5 |
| 3,093,656 | 6/1963 | Dreher et al. | 252—51.5 |
| 3,078,228 | 2/1963 | Smith et al. | 252—51.5 A |

DANIEL E. WYMAN, Primary Examiner

I. VAUGHN, Assistant Examiner

U.S. Cl. X.R.

252—51.5 A